United States Patent [19]
Wendte

[11] Patent Number: 5,995,894
[45] Date of Patent: Nov. 30, 1999

[54] SYSTEM FOR ANALYZING SPATIALLY-VARIABLE HARVEST DATA BY PASS

[75] Inventor: Keith W. Wendte, Hinsdale, Ill.

[73] Assignee: Case Corporation, Racine, Wis.

[21] Appl. No.: 08/863,544

[22] Filed: May 27, 1997

[51] Int. Cl.$^6$ ............................ G06F 157/00; G06F 13/00
[52] U.S. Cl. ................................ 701/50; 701/1; 701/201; 701/208; 701/202; 705/4
[58] Field of Search .................................. 701/50, 1, 201, 701/208, 202; 705/4

[56] References Cited

U.S. PATENT DOCUMENTS

| | | |
|---|---|---|
| Re. 35,100 | 11/1995 | Monson et al. . |
| 5,220,876 | 6/1993 | Monson et al. . |
| 5,455,769 | 10/1995 | Panoushek et al. . |
| 5,712,782 | 1/1998 | Weigelt et al. ............................ 701/50 |
| 5,751,576 | 5/1998 | Monson ..................................... 701/50 |
| 5,809,440 | 9/1998 | Beck et al. ................................ 701/50 |
| 5,870,686 | 2/1999 | Monson ..................................... 701/50 |
| 5,897,619 | 4/1999 | Hargrove, Jr. et al. ...................... 705/4 |

FOREIGN PATENT DOCUMENTS 0 576 121 A1   4/1993   European Pat. Off. .

OTHER PUBLICATIONS

"Yield Performance as Affected by Row Spacing and Tillage Practice" by W.E. Hart, F.D. Tompkins, T.E. Morgan and J.F. Gradley, The Univeristy of Tennessee Abstract.

"Control Concepts for Tillage Systems" by R.L. Schafer, S.C. Young, J.G. Hendrick, C.E. Johnson, 1981 Winter Meeting American Society of Agricultural Engineers, Paper No. 81–1601.

"Constructing Your Farm Mapping Software System" by Grant Mangold, *Dealer Progress*, p. 50–51, Dec. 1995.

"Yield Monitoring Experiences—1994" by Ted S. Macy, D. L Thackery, Nancy C. Macy, ASAE Winter Meeting, Dec. 16, 1994.

"Yield Measurements on Combine Harvesters" by H. Auernhammer, M. Demmel, K. Muhr, J. Rottmeier, K. Wild, 1993 Wintermeeting, ASAE, Paper No. 931506, Dec. 12–17, 1993.

"New in Precision" by Kristi Lee Johnson, *Fin*, pp. 36–37, May/Jun., 1995.

"Cotton Yield Monitor Will Close Loop on Site Specific Farming" Supplement to Delta Farm Press, Apr. 28, 1995.

"Managing Time, Money, Resources" ag/Innovator, *Successful Farming*, p. 15, Mid–Mar. 1995.

(List continued on next page.)

Primary Examiner—William A. Cuchlinski, Jr.
Assistant Examiner—Olga Hernandez
Attorney, Agent, or Firm—Foley & Lardner

[57] ABSTRACT

An apparatus is provided which analyzes spatially-variable harvest data for one of the passes made by an agricultural harvesting vehicle through an agricultural field. The harvesting vehicle supports an implement for harvesting crop during each pass through the field. The apparatus includes a digital memory, an electronic display, a processor circuit and an operator-actuatable input device. The digital memory stores a geo-referenced map of the field including harvest data representative of at least one sensed parameter of the harvested crop and pass data representative of the plurality of passes of the harvesting vehicle through the field. The processor circuit is configured to read the geo-referenced map of the field from the memory and to generate a display signal therefrom which, when applied to the electronic display, generates visible indicia of at least a portion of the field and at least one sensed parameter of the harvested crop. The operator-actuatable input device is coupled to the processor circuit and configured to generate an input signal which identifies one of the passes of the harvesting vehicle. The processor circuit analyzes the harvest data representative of the at least one sensed parameter of the harvested crop that was harvested by the implement during the identified pass of the vehicle, and generates the display signal to cause the electronic display to display a result of the analysis in association with the identified pass of the vehicle.

20 Claims, 5 Drawing Sheets

OTHER PUBLICATIONS

"Part Three–Illegal Kringig" by Joe W. Tevis, ag/Innovator, p. 10, Nov. 1994.

"Pocketbook Accuracy" by Neil Havermale, ag/Innovator, p. 6, Oct. 1994.

"CD System Highlights" ag/Innovator, p. 10, Dec. 1994.

"Photo CD Images and the NRCS", by Brian Huberty, ag/Innovator, p. 10, Dec. 1994.

"Part One–Grid Sampling for Precision and Profit" by Nyle Wollenhaupt and R.P. Wolkowski, ag/Innovator, p. 8, Dec. 1994.

"Part Two–Grid Sampling for Precision and Profit" by Nyle Wollenhaupt and R.P. Wolkowski, ag/Innovator, p. 5, Jan. 1995.

"Part Three–Grid Sampling for Precision and Profit" by Nyle Wollenhaupt and R.P. Wolkowski, ag/Innovator, p. 5, Feb. 1995.

"Part Four–Grid Sampling for Precision and Profit" by Nyle Wollenhaupt and R.P. Wolkowski, ag/Innovator, p. 5, Mar. 1995.

"From Soil Sampling to Distributions . . . " by Joe W. Tevis, ag/Innovator, p. 8, Jul. 1994.

Part Two–How to Use Inverse Distance and Kriging Interpolation, by Joe Tevis, ag/Innovator, p. 8, Aug. 1994.

"Going With The Flow . . . " by Neil Havermale, ag/Innovator, p. 8, Sep. 1994.

"What's Your Choice?" by Neil Havermale, ag/Innovator, p. 1, Dec. 1994.

"Weed Mapping & Site–Specific Sprayig by Prescription", ag/Innovator, p. 1, Dec. 1994.

"GPS or "Swathing"? Cconsiderations for Yield Mapping" by Dr. F.J. Pierce, ag/Innovator, p. 8, Oct. 1994.

"Site–Specific Standards" by Emmet Barker, ag/Innovator, p. 8, Nov. 1994.

"Database and Data Considerations . . . " by Gary Wilson, ag/Innovator, p. 4, Mar. 1994.

"Who Owns The Data?" by Jerry Mulliken, ag/Innovator, p. 4, Mar. 1994.

"Whose Data IS it?" by Neil Havermale, ag/Innovator, p. 14, Feb. 1994.

"Top Ten Opinions" by John Schueller, ag/Innovator, p. 14, Feb. 1994.

"Economics of Precision Farming" by Jess Lowenerg–De-Boer, ag/Innovator, p. 12, Sep. 1994.

"Precision Farming" by Ted Macy, ag/Innovator, p. 14, May, 1994.

"Take the First Step" by Ted Macy, ag/Innovator, p. 13, Jun., 1994.

"Part Three–SSM: Pros, Cons and Realities . . . " F.J. Pierce, ag/Innovator, p. 5, Mar. 1995.

"Part Two—SSM: Pros, Cons and Realtities . . . " by F.J. Pierce, ag/Innovator, p. 5, Feb. 1995.

"Part One—SSM: Pros, Cons and Realities . . . " by F.J. Pierce, ag/Innovator, p. 4, Jan. 1995.

"Picture–Perfect Yields" by Larry Reichenberger, *Farm Journal*, pp. A–4, B–1, Jan. 1993.

"Six–Ply Precision" by Larry Reichenberger, *Top Producer*, pp. 14–17, Jan. 1995.

"Now You Can Know Exact Yield On the Go" by Eric McMullin, *Fin*, pp. 32–34, May/Jun. 1992.

"The Use of GPS in Argiculture for Yield Mapping and Tractor Implement Guidance" by H. Auernhamer nad T. Muhr, PGPS '91, First International Symposium Real Time Differential Applications of the Global Positioning System, pp. 455–465.

| DATA POINT NO. | BU/ACRE | MOISTURE | LONGITUDE | LATITUDE | PASS INDICATOR | PASS INDICIA |
|---|---|---|---|---|---|---|
| 1 | 32.0739 | 17.7 | -88.72915 | 39.07104 | 1 | 1 |
| 2 | 56.5808 | 18.1 | -88.72911 | 39.07105 | 1 | 1 |
| 3 | 64.1104 | 17.1 | -88.72907 | 39.07106 | 1 | 1 |
| 4 | 96.1741 | 16.4 | -88.72903 | 39.07107 | 1 | 1 |
| . | . | . | . | . | . | . |
| . | . | . | . | . | . | . |
| 1021 | 98.2322 | 17.4 | -88.73433 | 39.08777 | 1 | 1 |
| 1022 | — | — | -88.73444 | 39.08779 | 0 | — |
| 1023 | 97.3233 | 18.9 | -88.74578 | 39.08786 | 1 | 2 |
| 1024 | 97.6577 | 17.8 | -88.74582 | 39.08792 | 1 | 2 |
| . | . | . | . | . | . | . |
| . | . | . | . | . | . | . |
| 2768 | 84.2833 | 16.3 | -88.76322 | 39.08842 | 1 | 2 |
| 2769 | — | — | -88.76362 | 39.08851 | 0 | — |
| 2770 | 89.3235 | 18.2 | -88.76377 | 39.08861 | 1 | 3 |
| 2771 | 89.3242 | 19.4 | -88.76444 | 39.08878 | 1 | 3 |
| . | . | . | . | . | . | . |

FIG. 5

SYSTEM FOR ANALYZING SPATIALLY-VARIABLE HARVEST DATA BY PASS

FIELD OF THE INVENTION

The present invention relates to the analysis of spatially-variable farming data. In particular, the present invention relates to a system and a method of analyzing spatially-variable harvest data for a pass through an agricultural field by an agricultural vehicle.

BACKGROUND OF THE INVENTION

The analysis of site-specific farming data is a complex task involving various characteristics of a field, known and unknown interactions between those characteristics, and the processing of large amounts of data. Current systems do not always provide easy-to-use tools for analyzing site-specific data in a flexible manner. The inability to correlate characteristics with each other may prevent the discovery of relationships and interactions between different characteristics that occur within fields. The inability to discover relationships may result in farming inputs being applied in a less than optimal manner, resulting in increased costs, reduced crop yield or excess environmental damage. The inability to quantitatively analyze the effect of farming inputs on yield may prevent the performance of an informed cost-benefit analysis to determine the optimum approach to take. In addition, the lack of flexible analysis tools may discourage a farmer from "experimenting" by applying certain farming inputs and determining the effect on field characteristics including yield since the farmer may not be able to fully analyze the results.

For example, a farmer may want to experiment by laying out several plots in a field which correspond to different levels or types of farming inputs, gather harvesting data associated with each of these plots, and then easily analyze the data to determine which farming inputs result in the greatest yield or cost margin. It would be desirable to provide a system wherein, as a field is harvested by a harvesting vehicle (e.g., a combine), each pass through the field is automatically assigned a value so that various statistics (e.g., yield and moisture content data) are calculated for each pass through the field. Thus, the farmer could obtain precise statistical data for any pass through the field, including average yield and average moisture content data for an identified pass. It would be desirable to provide tools for analyzing farming data on a pass-by-pass basis.

It would be desirable to assign values to the passes by automatically incrementing the number assigned to the current pass each time the combine header is raised above a predetermined height. Thus, when a pass extends through the length of the field, the pass number will be automatically incremented when the operator raises the header at the headland of the field. However, a farmer may want to lay out his experimental plots such that there is more than one pass through the length of a field, or such that a single pass does not extend for the entire length of the field. In this situation, it would also be desirable to allow the farmer to manually cause the pass number to be incremented by raising and then lowering the header to indicate the starting and ending locations of the pass. Thus, a farmer could lay out one, or several, experimental plots within the length of a field, and then generate statistics for each individual pass using the header to signal starting and ending locations of each pass. Unfortunately, current systems do not include the ability to easily analyze and manipulate data on a pass-by-pass basis. Currently, the farmer is required to fully specify the location of each plot prior to analyzing the data. It would be desirable to eliminate the need to manually enter location data for plots.

SUMMARY OF THE INVENTION

A first embodiment of the present invention relates to an apparatus for analyzing spatially-variable harvest data for one of the passes made by an agricultural harvesting vehicle through an agricultural field. The harvesting vehicle supports an implement for harvesting crop during each pass through the field. The apparatus includes a digital memory, an electronic display, a processor circuit and an operator-actuatable input device. The digital memory stores a geo-referenced map of the field including harvest data representative of at least one sensed parameter of the harvested crop and pass data representative of the plurality of passes of the harvesting vehicle through the field. The processor circuit is configured to read the geo-referenced map of the field from the memory and to generate a display signal therefrom which, when applied to the electronic display, generates visible indicia of at least a portion of the field and at least one sensed parameter of the harvested crop. The operator-actuatable input device is coupled to the processor circuit and configured to generate an input signal which identifies one of the passes of the harvesting vehicle. The processor circuit analyzes the harvest data representative of the at least one sensed parameter of the harvested crop that was harvested by the implement during the identified pass of the vehicle, and generates the display signal to cause the electronic display to display a result of the analysis in association with the identified pass of the vehicle.

Another embodiment of the present invention relates to a method of analyzing spatially-variable harvest data for one of the passes made by an agricultural harvesting vehicle through an agricultural field. The harvesting vehicle supports an implement for harvesting crop during each pass through the field. A geo-referenced map of the field including harvest data representative of at least one sensed parameter of the harvested crop and pass data representative of the plurality of passes of the harvesting vehicle through the field is provided in a digital memory. A visual map of at least a portion of the field is displayed on an electronic display. The visual map includes a visual representation of the at least one sensed parameter of the harvested crop. One of the passes of the harvesting vehicle is identified and the harvest data representative of the at least one sensed parameter of the harvested crop that was harvested by the implement during the identified pass of the vehicle is analyzed. A result of the analysis is displayed on the electronic display in association with the identified pass of the vehicle.

Another embodiment of the present invention relates to an article of manufacture including a computer-readable medium having computer program code stored therein for causing a computer system to analyze spatially-variable harvest data for one of the passes made by an agricultural harvesting vehicle through an agricultural field. A geo-referenced map of the field including harvest data representative of at least one sensed parameter of the harvested crop and pass data representative of the plurality of passes of the harvesting vehicle through the field is read. The geo-referenced map is stored in a digital memory. A map display signal is generated to display a visual map of at least a portion of the field on an electronic display. The visual map includes a visual representation of the at least one sensed parameter of the harvested crop. An input signal is processed which identifies one of the passes of the harvesting vehicle. The harvest data representative of the at least one sensed parameter of the harvested crop that was harvested by the implement during the identified pass of the vehicle is analyzed. A result display signal is generated to display a result of the analysis on the electronic display in association with the identified pass of the vehicle.

DESCRIPTION OF THE DRAWINGS

The preferred exemplary embodiment of this invention will hereinafter be described in conjunction with the appended drawings, wherein like reference numerals denote like elements, and.

DETAILED DESCRIPTION OF A PREFERRED EXEMPLARY EMBODIMENT

Figure 1:
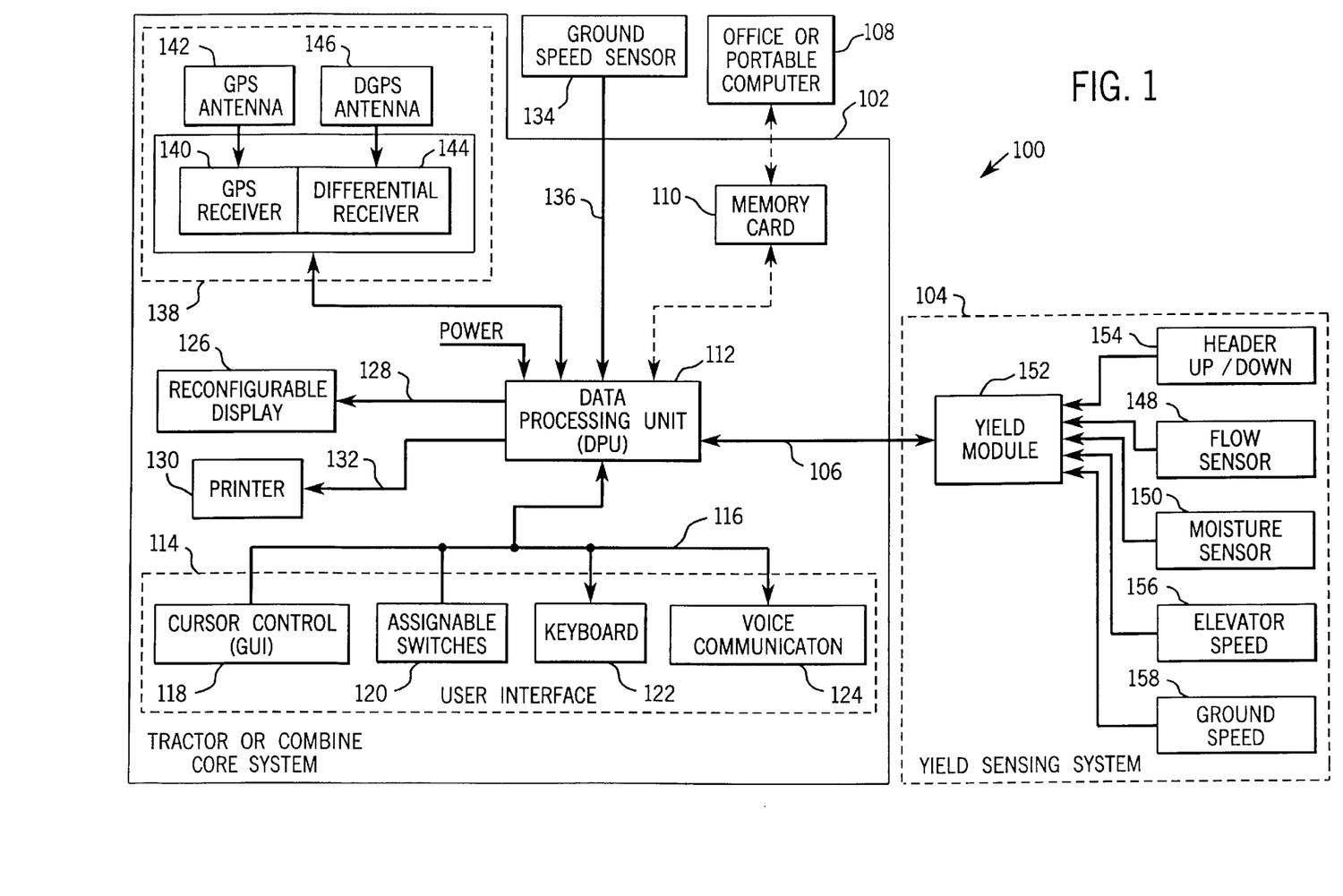
FIG. 1 is a block diagram illustrating a site-specific farming system including a harvest vehicle (e.g., a combine) equipped with sensors for sampling site-specific characteristics of a field (e.g., yield and moisture content), a memory card for communicating site-specific characteristic data, and an office or portable computer.

Referring to FIG. 1, a site-specific farming system 100 includes one or more core systems 102 which provide site-specific data processing functions for different agricultural vehicles including tractors and combines. In farming system 100, each tractor or combine is equipped with its own core system 102. Each combine is also equipped with a yield sensing system 104, and core system 102 of the combine communicates with yield sensing system 104 over a bus 106. Preferably, core system 102 is removable and can be installed on a variety of agricultural vehicles.

Farming system 100 also includes a workstation or personal computer 108 which may be located in the farm office or may be portable. A medium of communication is used to transfer spatially-variable harvest data between core system 102 and computer 108. Preferably, core system 102 and computer 108 each include a read/write interface (not shown) for a removable memory card 110 which can be transported between core system 102 and computer 108. Memory card 110 may be a Type II PCMCIA card made by Centennial Technologies, Inc. However, other mediums of communication (e.g., floppy or hard disk, RF, infrared, RS-232/485 links, etc.) may be used. Memory card 110 is used to transfer spatially-variable harvest data from core system 102 on a combine to computer 108, and to transfer prescription maps from computer 108 to core system 102 on a tractor equipped with variable-rate application hardware.

Core system 102 includes a digital data processing unit (DPU) 112 which communicates with the vehicle operator through a user interface 114 via a series of links 116 (e.g., an RS-232/485 interface; a standard keyboard interface). DPU 112 includes a processor (e.g., a 486 DX or Pentium® microprocessor) and various types of memory which may include non-volatile memory (PROM, EEPROM or FLASH) and volatile memory (RAM). The processor executes a program stored in the non-volatile memory and the volatile memory (RAM) may include a battery back-up circuit. Alternatively, DPU 112 may be implemented using dedicated, specific purpose equipment or hard-wired logic circuitry. User interface 114 includes a graphical user interface (GUI) 118 providing cursor control (e.g., a mouse, joystick or four-way switch with up, down, right and left positions), assignable switches 120 (e.g. push buttons) configurable by the processor, a keyboard 122, and a voice-communication interface 124.

DPU 112 is configured to generate display signals which are applied to a reconfigurable display 126 (e.g., a CRT or flat screen LCD display) via communication link 128. Display 126 is preferably an active-matrix LCD capable of displaying full-motion video and a number of colors under varying ambient light conditions. Display 126 is also capable of displaying graphics and alphanumeric characters. Display 126 is used, inter alia, to display the current configurations of assignable switches 120. DPU 112, user interface 114 and display 126 are located in the vehicle cab such that the operator has easy access to user interface 114 and a substantially unobstructed view of display 126. Core system 102 may also include a printer 130 in the cab which communicates with DPU 112 via an interface 132 (e.g., an RS-232 link).

DPU 112 receives signals representing the speed of the vehicle from ground speed sensor 134 via an interface 136 (e.g., a frequency interface). Ground speed sensor 134 may include a magnetic pickup sensor configured to sense the speed of the vehicle's wheels or transmission, or may include a radar device mounted to the body of the vehicle. The speed signals may be used by DPU 112 to calculate the distance traveled as described below.

DPU 112 also communicates with a location signal generation circuit 138 which generates location signals representing the vehicle's position. Circuit 138 includes a global positioning system (GPS) signal receiver 140 with an associated antenna 142, and a differential GPS (DGPS) signal receiver 144 with an associated antenna 146. GPS receiver 140 determines longitude and latitude coordinates (and altitude) of the vehicle from signals transmitted by the GPS satellite network. The accuracy of the position data is improved by applying correction signals received by DGPS receiver 144.

When core system 102 is mounted on a combine, DPU 112 communicates with yield sensing system 104 via link 106, which may carry RS-232/485 signals. Yield sensing system 104 typically includes a yield flow sensor 148 and a moisture sensor 150. Yield flow sensor 148 may include an impact-type mass flow rate sensor attached to a steel plate which is struck by grain passing through the clean-grain elevator of the combine to measure the force of the grain flow. Moisture sensor 150 may be a capacitive-type sensor mounted on the underside of the grain tank loading auger of the combine to measure the moisture content of grain passing near moisture sensor 150. Moisture sensor 150 may include a grain temperature sensor to compensate the grain moisture signals for temperature. DPU 112 receives sensed signals from flow sensor 148 and moisture sensor 150, and receives location signals from location signal generation circuit 138 which represent the positions of the combine where grain flow and moisture content were sampled. The grain flow and moisture content signals are processed to form data representative of the respective characteristic, and this data is correlated with location data representative of the location signals. Correlated data is stored in memory card 110 or in another memory.

In one embodiment, DPU 112 receives RS-485 serial communication signals from a yield module unit (YMU) 152 which is configured to perform data processing for yield sensing system 104. A separate YMU off-loads data processing functions from DPU 112, and minimizes wiring between the combine and DPU 112. YMU 152 receives sensed signals from flow sensor 148, moisture sensor 150, a header up/down sensor 154, an elevator speed sensor 156 and a ground speed sensor 158. Header up/down sensor 154 senses the position of the combine's header to detect whether the combine is harvesting. When header position is above a pre-programmed value, YMU 152 assumes the combine is not harvesting and yield information is not calculated. A header below the pre-programmed value indicates that the combine is harvesting, and a hysteresis band can be used to prevent erroneous transitions. Systems for controlling and displaying the status of a combine header are described in U.S. Pat. Nos. 5,455,769 and 5,465,560, commonly assigned and incorporated herein by reference. Elevator speed sensor 156 senses the speed of the clean grain elevator to determine the speed at which grain passes through the elevator. Signals from elevator speed sensor 156 may be used to compensate the yield calculations for the delay before harvested grain is sensed. Ground speed sensor 158 senses ground speed of the combine, and may be the same as ground speed sensor 134.

To convert the grain flow signals into yield data, the distance traveled by the combine is determined by multiplying the combine's speed by elapsed time. The speed may be based upon signals sensed by speed sensor 134 or 158, or may be determined by calculating the difference between successive position signals received from location signal generation circuit 138 and dividing by elapsed time. The yield (e.g., bu/acre) is determined by dividing the quantity of sensed grain (e.g., bu) by the area of the field harvested (e.g., acres), wherein the quantity of sensed grain is the product of the grain flow rate and time, and the area is the product of the width of cut and distance traveled.

YMU 152 uses signals from sensors 148, 150, 154, 156 and 158 to calculate and communicate yield and moisture content data to DPU 112 via bus 106. The update rate at which data is communicated may be once per second. YMU 152 may provide instantaneous yield and moisture content data, and may also provide field and load total (summary) values for grain weight, wet and dry bushels, average moisture, area harvested and dry yield. Thus, YMU 152 allows specific yield processing functions to be moved from DPU 112. Alternatively, YMU 152 may send raw sensed data to DPU 112 and DPU 112 may perform the calculations. Farming system 100 could also be configured such that DPU 112 reads the signals directly from sensors 148, 150, 154, 156 and 158. In another alternative, core system 102 may include a yield monitor unit which is configured to read the signals directly from sensors 148, 150, 154, 156 and 158, calculate data (e.g., yield and moisture content) and write the data on memory card 110. Thus, the yield monitor unit performs less processing than DPU 112.

Figure 2:
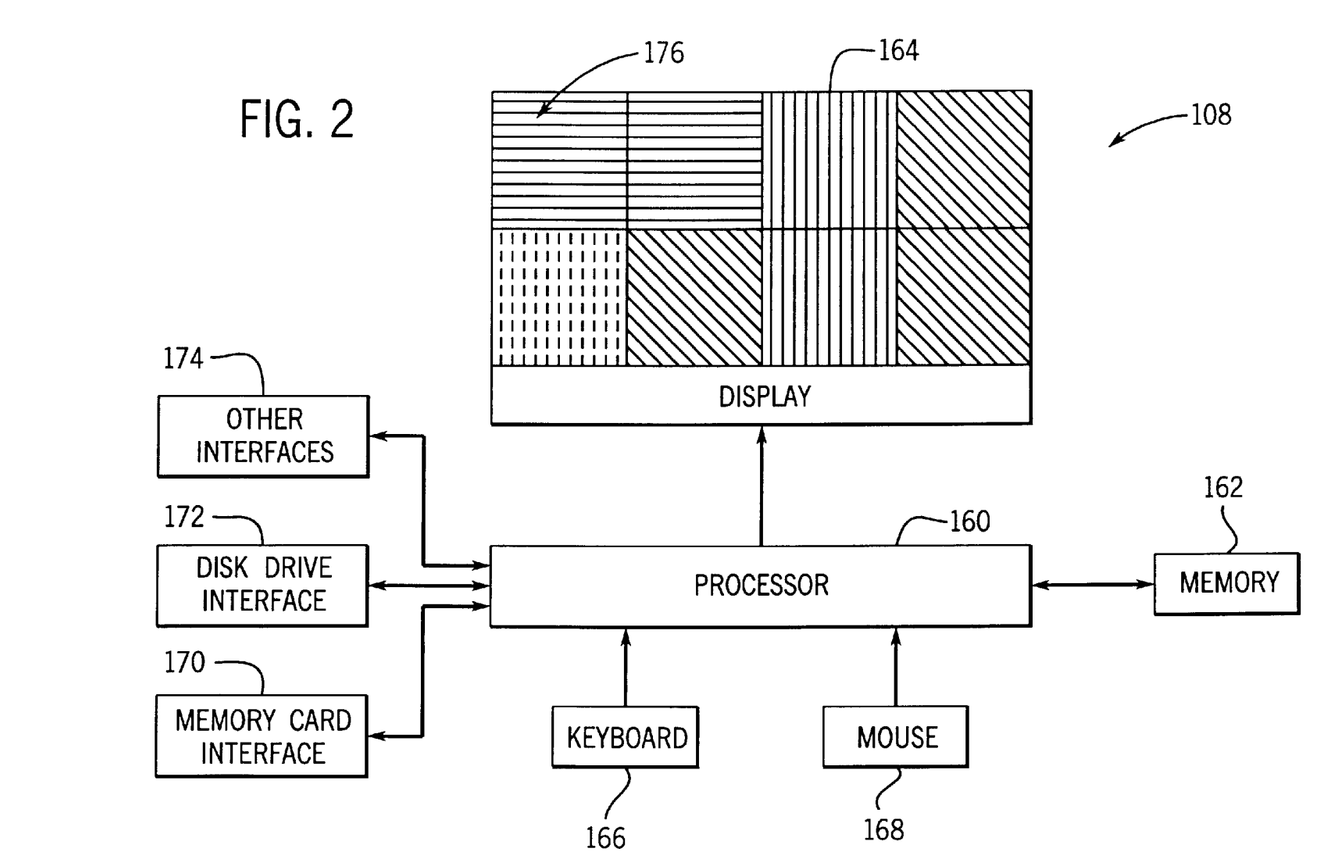
FIG. 2 is a block diagram of the office or portable computer shown in FIG. 1 which can be used to analyze the site-specific characteristic data stored on the memory card shown in FIG. 1.

Referring to FIG. 2, computer 108 is preferably a programmed personal computer including a processor 160, a memory circuit 162, a color or monochrome display 164, operator-actuatable input devices such as a keyboard 166 or a mouse 168, and input/output interfaces such as a memory card interface 170, a hard or floppy disk drive interface 172, and other interfaces 174 (e.g., RF or infrared). An operator-actuatable input device such as a joystick, light pen or touch screen may also be used. Alternatively, computer 108 may be implemented using dedicated, specific-purpose equipment or hard-wired logic circuitry. Processor 160 may be an x86 or Pentium® microprocessor configured to execute a program stored in memory 162 or on a disk read by disk drive interface 172. The program causes computer 108 to analyze spatially-variable harvest data by performing a series of steps (described below). Preferably, processor 160 reads the spatially-variable harvest data including position information from memory card 110 using memory card interface 170. Data may also be entered using keyboard 166, mouse 168, disk drive interface 172, or another interface 174.

Processor 160 generates display signals which, when applied to display 164, cause alpha-numeric and graphical visible indicia of at least a portion of the field and at least one sensed parameter of the harvested crop to be displayed. For example, the display signals may cause display 164 to create a visual map 176 including a visual representation of at least one of the sensed parameters of the harvested crop. Preferably, display 164 is a color monitor, but it may also be a monochrome monitor capable of displaying different light intensity levels.

Figure 3:
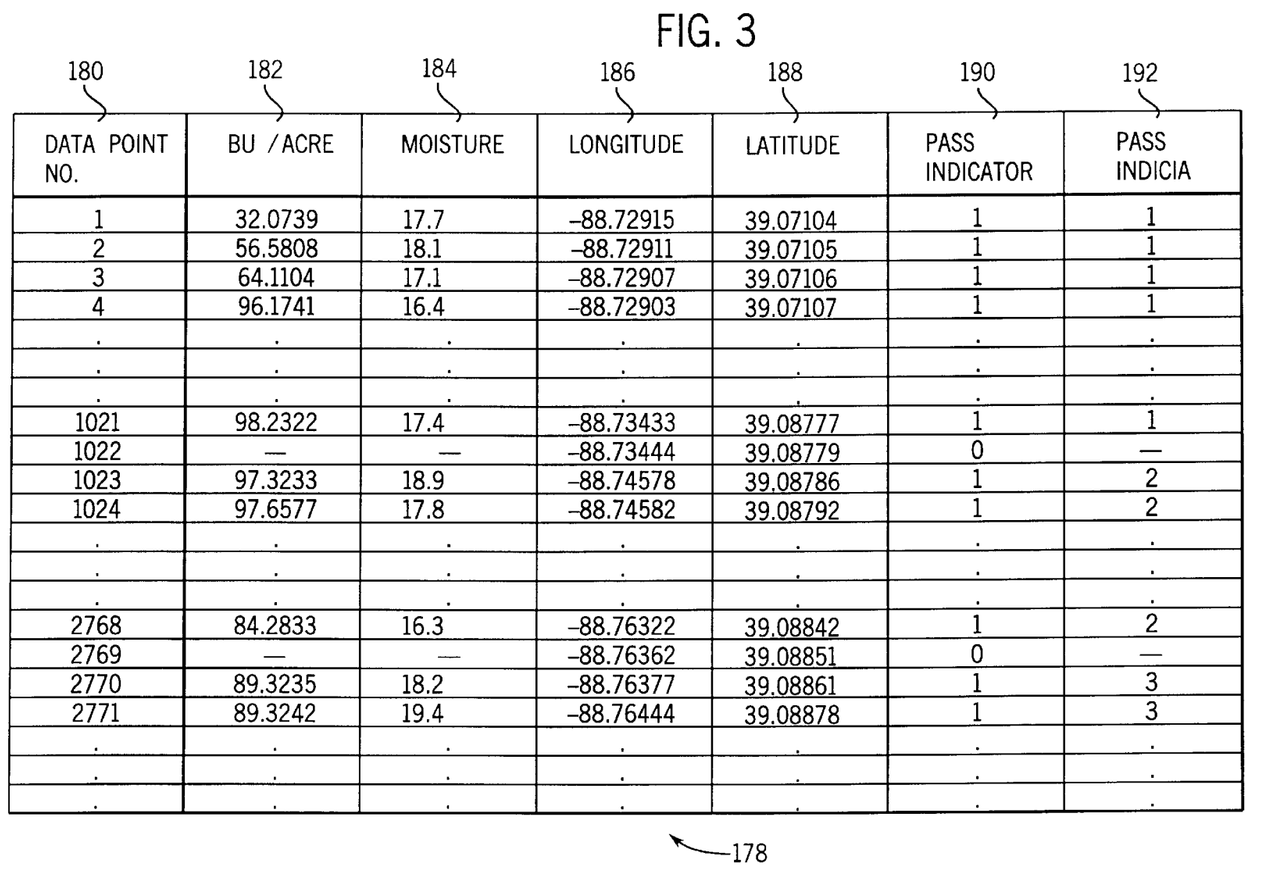
FIG. 3 represents a layer of data representing a spatially-variable characteristic of an agricultural field stored in memory.

FIG. 3 represents the structure in which a layer of spatially-variable harvest data representative of a characteristic of a farming field is stored in memory card 110 or memory 162. The data structure may be referred to as a geo-referenced digital map, or a layer of data. The structure is preferably implemented using a database 178 (e.g., a geographical information system (GIS) database) represented by a table, wherein each row represents a characteristic data point 180 taken at a location in the field. For example, a layer having 5000 data points is represented by a table having 5000 rows. Columns of information are associated with each data point 180. For example, the columns shown in FIG. 3 include yield data (bu/acre) 182, moisture content data 184, longitude 186 and latitude 188 coordinates at which each data point 180 was sampled, a pass indicator flag 190 and pass indicia 192.

A farmer may lay out his plots so that a single plot extends through the length of the field, in which case the farmer raises the combine header above a predetermined height at the headland of the field, thereby clearing pass indicator flag 190 (e.g., a value of 0) based upon the output signal generated by header up/down sensor 154. Alternatively, the farmer may want to lay out his experimental plots such that there is more than one pass through the length of the field, or such that a single pass does not extend through the entire length of the field. In this situation, the farmer causes pass indicia 192 to be incremented by raising and then lowering the header to indicate the starting and ending locations of the pass. Alternatively, to avoid the need to raise and then lower the header midway through the field, a switch input could be provided to allow the farmer to mark the starting or ending location of each pass. Thus, the farmer lays out one, or several, experimental plots within the length of the field, and then generates statistics for each individual pass using the header position to signal the starting and ending locations of each pass. Passes can also be combined or split using post-processing editing techniques on office computer 108.

The data structure of FIG. 3 represents, for example, a yield layer. Data in the first row (Data Point No. 1) indicates that flow sensor 148 and moisture sensor 150 of the combine sensed grain flow corresponding to a yield of 32.0739 bu/acre and a moisture content of 17.7, at a location defined by longitude and latitude coordinates −88.72915 and 39.07104, respectively. Pass indicator flag 190 was set (e.g., a value of 1) indicating that the combine was harvesting while sampling data associated with Data Point No. 1. Pass indicia 192 associated with Data Point No. 1 was assigned a value of 1 by DPU 112 indicating that sensed data associated with Data Point No. 1 was sampled during a first pass of the combine through the field.

Similarly, pass indicator 190 associated with Data Point No. 1021 was set and pass indicia 192 was assigned a value of 1 by DPU 112, indicating that data associated with Data Point No. 1021 was sampled during the first pass through the field. Pass indicator 190 associated with Data Point No. 1022, however, was not set (e.g., a value of 0) indicating that the combine was not harvesting while sampling data associated with Data Point No. 1022. As discussed above, the value of pass indicator 190 is based on a signal generated by header up/down sensor 154. In the alternative, a steering angle sensor may replace header up/down sensor 154 so that pass indicator 190 is set based on the steering angle of the combine representative of whether the combine is harvesting or whether the combine is turning at the headland of the field. Pass indicia 192 associated with Data Point No. 1022 was not assigned a value by DPU 112 because the combine was not harvesting.

At the time sensed data associated with Data Point No. 1023 was sampled, the combine resumed harvesting the field. Pass indicator 190 was set and pass indicia 192 associated with Data Point No. 1023 was incremented to a value of 2 by DPU 112, indicating that sensed data associated with Data Point No. 1023 was sampled during the second pass through the field. DPU 112 automatically incremented the value of pass indicia 192 between the end of an old pass and the start of a new pass, which were determined based on the position of the header compared with the predetermined value. Alternatively, the value of pass indicia 192 may be calculated by processor 160 in office computer 108 based upon pass indicator 190.

The data structure represented by FIG. 3 may include additional columns representing other spatially-variable data. For example, a harvest data structure in database 178 may include the following fields:

| Data Item | Description |
| --- | --- |
| Longitude | Longitude position of data from GPS |
| Latitude | Latitude position of data from GPS |
| Flow Rate | Weight (wet) of grain passing by flow sensor 148 every second (e.g., lbs/sec). |
| Moisture | Percent of grain weight which is moisture |
| GPS Time | Time stamp from GPS (sec) |
| Cycles | Seconds covered by the data (e.g., 1, 2 or 3) |
| Distance | Distance (inches) traveled since last data point |
| Swath | Width of cut of header (inches) |
| Pass Indicator | 1 = Header Down; 0 = Header Up |
| Pass Indicia | Number of the pass through a field |
| Grain | Type of grain (e.g., corn) |
| GPS Status | 1 = Good (>= 4 satellites); 2 = Marginal (3 satellites); 3 = Bad (<= 2 satellites) |
| Altitude | Altitude (feet) of data from GPS |

The data structure may also include header information such as a vehicle identifier, a farm identifier, a field identifier, a load identifier, and a serial number for hardware components of farming system 100 (e.g., a yield module serial number). The harvest data structure is preferably stored as a DOS file in memory card 110.

Figure 4:
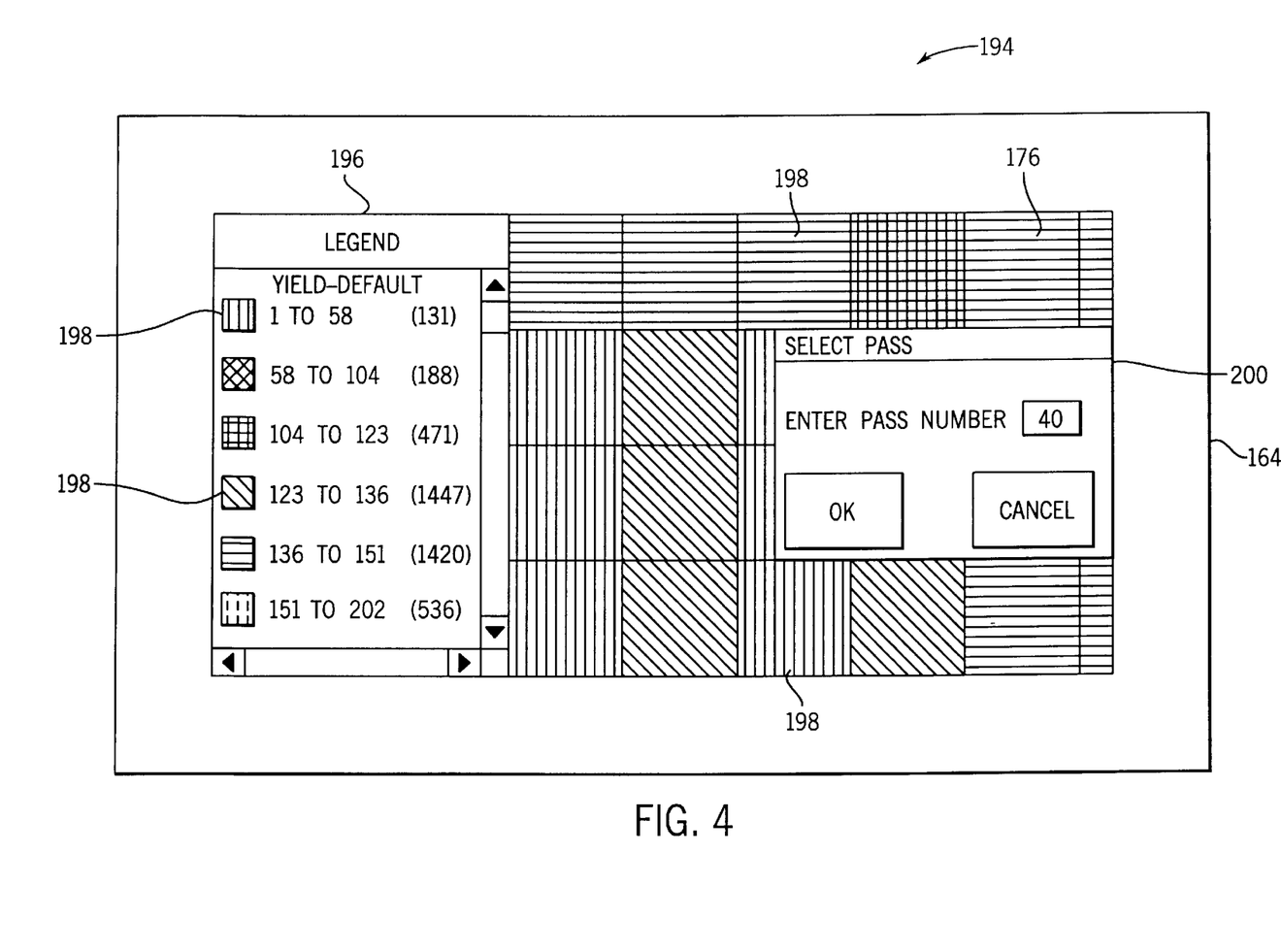
FIG. 4 represents a user interface screen on the office computer which allows a user to identify a particular pass of a harvesting vehicle through a field.

FIG. 4 represents a user interface screen 194 on office computer 108 which allows a user to identify a particular pass through the field. Database 178 representing the geo-referenced digital map of the field, which includes harvest data representative of at least one sensed parameter of the harvested crop (e.g., yield data or moisture content data) and pass data (e.g., pass indicator flag 190 and pass indicia 192), is provided to computer 108 in memory card 110 or digital memory 162.

Visual map 176 of at least a portion of the field is displayed on electronic display 164. Visual map 176 includes a visual representation of at least one of the sensed parameters of the harvested crop. For example, a legend 196 displays distinct visible indicia 198 representing various yield ranges. Visible indicia 198 may be visually represented on electronic display 164 in several ways. In a preferred embodiment, distinguishable colors represent different ranges of the average data (e.g., yield) in each visible data block. For example, the colors red, orange, yellow, green, blue and purple may represent increasing ranges of average yield. Legend 196 displays each color and its associated yield range: 1 to 58 bu/acre (red); 58 to 104 bu/acre (orange); 104 to 123 bu/acre (yellow); 123 to 136 bu/acre (green); 136 to 151 bu/acre (blue); 151 to 202 bu/acre (purple). The ranges and colors could also be selectable by the user.

A specific pass is identified by entering pass indicia 192 corresponding to the identified pass (e.g., 40) in a dialog box 200 using the operator-actuatable input device (e.g., keyboard 166) coupled to processor 160. Alternatively, mouse 168 can be manipulated by the user to identify a specific pass (e.g., by moving a cursor on top of the visual pass and then "clicking" mouse 168). Thus, the operator-actuatable input device generates an input signal which identifies one of the passes of the harvesting vehicle (e.g., pass 40).

Figure 5:
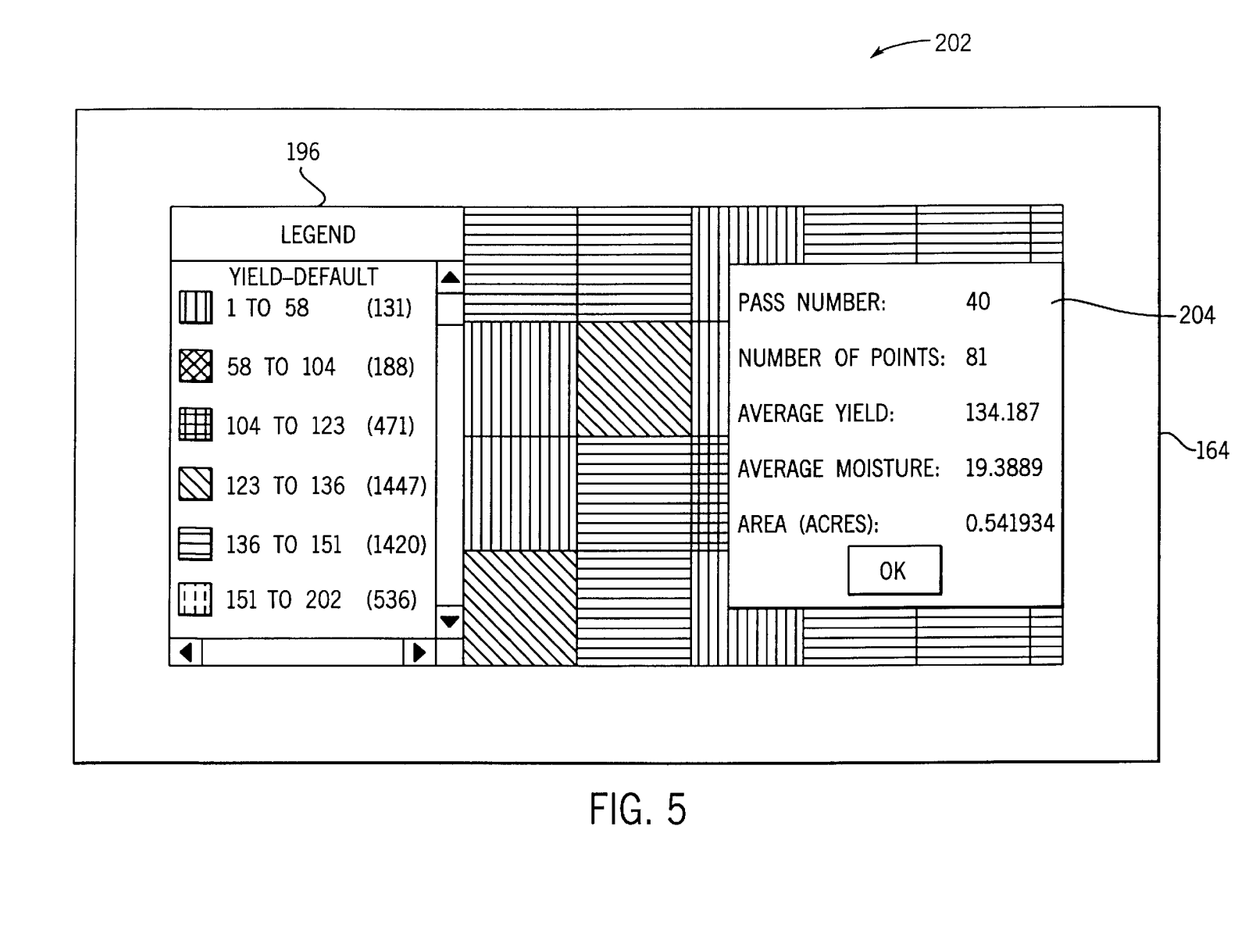
FIG. 5 represents a result screen on the office computer which displays the result of the analysis of data in association with the identified pass of the harvesting vehicle.

FIG. 5 represents a result screen 202 on office computer 108 which displays a result 204 of the analysis of harvest data in association with the pass identified in dialog box 200. To generate result screen 202, processor 160 analyzes the harvest data representative of at least one sensed parameter (e.g., yield data or moisture content data) of the harvested crop that was harvested by an implement supported by the harvesting vehicle during the identified pass (e.g., pass 40) of the vehicle. Processor 160 is configured to read the geo-referenced map of the field stored in memory card 110, to identify the harvest data associated with the identified pass and to calculate result 204 of the analysis of the harvest data associated with the identified pass. Then, processor 160 generates a display signal to cause electronic display 164 to display result 204 of the analysis in association with the identified pass of the vehicle. In the preferred embodiment of the present invention, processor 160 calculates an average value of at least one sensed parameter of the harvested crop (e.g., average yield) that was harvested by the implement during the identified pass. Processor 160 is also configured to calculate the average moisture content and the total area harvested during the identified pass.

Processor 160 is configured to calculate the average value of at least one sensed parameter of the harvested crop for the identified pass by calculating a distance-weighted average of the parameter values associated with data points 180 included in the identified pass. For example, to calculate the average yield for the first pass illustrated in FIG. 3, processor 160 reads yield data 182 associated with data points 180 included in the first pass (e.g., Data Point Nos. 1–1021). Data points 180 are not necessarily equidistant from one another. Thus, yield data 182 associated with each data point 180 may not be weighted equally by processor 160 in the average yield calculation for the identified pass. In one embodiment of the present invention, processor 160 calculates a distance-weighted average for the identified pass based on the distance traveled by the combine between data points 180. The distance is determined by calculating the distance between successive positions of the combine (stored as longitude data 186 and latitude data 188). Then, each yield data point 182 associated with a given data point 180 is multiplied by a distance-dependent weight factor so that each yield data point 182 is assigned a proportional weight in the overall yield calculation for the identified pass. For example, the weighting of a yield data point 182 will increase with the distance between successive data points 180. Alternatively, processor 160 may calculate the average value of at least one sensed parameter of the harvested crop for the identified pass by calculating the sum of the parameter values associated with data points 180 included in the identified pass and dividing by the number of such data points 180.

It is understood that the above description is of a preferred exemplary embodiment of this invention, and that the invention is not limited to the specific forms described. For example, database 178 may be represented by separate tables for yield data and moisture content data. Additionally, passes are not necessarily linear. In order to maximize the use of their fields, farmers may lay out plots in arrangements which result in non-linear passes (e.g., semi-circular, etc.). Finally, visual map 176 may include multiple layers of harvest data in the same map (e.g., yield data and moisture content data). These and other modifications may be made in the design and arrangement of the elements without departing from the scope of the invention as expressed in the appended claims.

I claim:

1. An apparatus for analyzing spatially-variable harvest data for one of a plurality of passes made by an agricultural harvesting vehicle through an agricultural field, the harvesting vehicle supporting an implement for harvesting crop during each pass through the field, the apparatus comprising:
   a digital memory which stores a geo-referenced map of the field including harvest data representative of at least one sensed parameter of the harvested crop and pass data representative of the plurality of passes of the harvesting vehicle through the field;
   an electronic display;
   a processor circuit coupled to the memory and the electronic display, the processor circuit configured to read the geo-referenced map of the field from the memory and to generate a display signal therefrom which, when applied to the electronic display, generates visible indicia of at least a portion of the field and the at least one sensed parameter of the harvested crop; and
   an operator-actuatable input device coupled to the processor circuit and configured to generate an input signal which identifies one of the plurality of passes of the harvesting vehicle;
   wherein the processor circuit is further configured to analyze the harvest data representative of the at least one sensed parameter of the harvested crop that was harvested by the implement during the identified pass of the vehicle, and to generate the display signal to cause the electronic display to display a result of the analysis in association with the identified pass of the vehicle.

2. The apparatus of claim 1, wherein the processor circuit calculates an average value of the at least one sensed parameter of the harvested crop that was harvested by the implement during the identified pass.

3. The apparatus of claim 2, wherein the average value includes an average yield for the identified pass.

4. The apparatus of claim 1, wherein the processor circuit calculates the total area harvested during the identified pass.

5. The apparatus of claim 1, wherein the digital memory includes a removable memory card.

6. The apparatus of claim 1, wherein the harvest data is selected from the group consisting of yield data and moisture content data.

7. The apparatus of claim 1, wherein the pass data includes a pass indicia identifying each pass through the field.

8. The apparatus of claim 7, wherein the input signal is representative of the pass indicia of the identified pass.

9. The apparatus of claim 1, wherein the pass data includes data indicative of whether the implement was harvesting crop.

10. A method of analyzing spatially-variable harvest data for one of a plurality of passes made by an agricultural harvesting vehicle through an agricultural field, the harvesting vehicle supporting an implement for harvesting crop during each pass through the field, the method comprising the steps of:
    providing in a digital memory a geo-referenced map of the field including harvest data representative of at least one sensed parameter of the harvested crop and pass data representative of the plurality of passes of the harvesting vehicle through the field;
    displaying a visual map of at least a portion of the field on an electronic display, the visual map including a visual representation of the at least one sensed parameter of the harvested crop;
    identifying one of the plurality of passes of the harvesting vehicle;
    analyzing the harvest data representative of the at least one sensed parameter of the harvested crop that was harvested by the implement during the identified pass of the vehicle; and
    displaying a result of the analysis on the electronic display in association with the identified pass of the vehicle.

11. The method of claim 10, wherein the harvest data is selected from the group consisting of yield data and moisture content data.

12. The method of claim 10, wherein the pass data includes a pass indicia identifying each pass through the field.

13. The method of claim 12, wherein the step of identifying one of the plurality of passes includes the step of selecting the pass indicia associated with the identified pass.

14. The method of claim 10, wherein the step of analyzing the harvest data comprises the steps of:
    reading the geo-referenced map of the field;
    identifying the harvest data associated with the identified pass; and
    calculating the result of the analysis of the harvest data associated with the identified pass.

15. The method of claim 14, wherein the step of calculating the result includes calculating an average value of the at least one sensed parameter of the harvested crop that was harvested by the implement during the identified pass.

16. The method of claim 15, wherein the average value includes an average yield for the identified pass.

17. The method of claim 14, wherein the step of calculating the results includes calculating the total area harvested during the identified pass.

18. An article of manufacture, comprising:
    a computer-readable medium having computer program code stored therein for causing a computer system to analyze spatially-variable harvest data for one of a plurality of passes made by an agricultural harvesting vehicle through an agricultural field, by performing the steps of:

reading a geo-referenced map of the field including harvest data representative of at least one sensed parameter of the harvested crop and pass data representative of the plurality of passes of the harvesting vehicle through the field, the geo-referenced map being stored in a digital memory;

generating a map display signal to display a visual map of at least a portion of the field on an electronic display, the visual map including a visual representation of the at least one sensed parameter of the harvested crop;

processing an input signal which identifies one of the plurality of passes of the harvesting vehicle;

analyzing the harvest data representative of the at least one sensed parameter of the harvested crop that was harvested by the implement during the identified pass of the vehicle; and generating a result display signal to display a result of the analysis on the electronic display in association with the identified pass of the vehicle.

19. The article of manufacture of claim 18, wherein the step of analyzing the harvest data further comprises the steps of:

reading the geo-referenced map of the field;

identifying the harvest data associated with the identified pass; and calculating the result of the analysis of the harvest data associated with the identified pass.

20. The article of manufacture of claim 19, wherein the step of calculating the result includes calculating an average value of the at least one sensed parameter.

* * * * *